United States Patent [19]

Okada et al.

[11] Patent Number: 4,529,447
[45] Date of Patent: Jul. 16, 1985

[54] SIZING COMPOSITION

[75] Inventors: Masashi Okada, Nagaokakyo; Yasushi Nishigakiuchi, Uji; Yoichi Tominaga, Kyoto, all of Japan

[73] Assignee: Sanyo Chemical Industries, Ltd., Kyoto, Japan

[21] Appl. No.: 495,833

[22] Filed: May 18, 1983

[30] Foreign Application Priority Data

June 11, 1982 [JP] Japan.......................... 57-100974
Aug. 16, 1982 [JP] Japan.......................... 57-141985

[51] Int. Cl.$^3$ .......................... D21D 5/12; C09K 3/00
[52] U.S. Cl. .......................... 106/287.24; 106/287.23; 162/158
[58] Field of Search .............. 106/287.23, 213, 287.24; 162/158; 524/112

[56] References Cited

U.S. PATENT DOCUMENTS 3,102,064  8/1963  Wurzburg et al. .................. 162/158
4,040,900  8/1977  Mazarella et al. .................. 162/158
4,279,794  7/1981  Dumas .............................. 524/112

OTHER PUBLICATIONS

"Surface Active Ethylene Oxide Adducts", N. Schönfeldt, pp. 660, 661, Sep. 1971.
"Emulsifiers & Detergents", McCutcheons.

Primary Examiner—Theodore Morris
Attorney, Agent, or Firm—Oblon, Fisher, Spivak, McClelland & Maier

[57] ABSTRACT

A sizing composition comprises a carboxylic acid anhydride and a polyoxyalkylene nonionic surfactant blocked with a lower alkyl, acyl or carbamoyl group and/or an alkaline earth metal salt of a sulphur-containing anionic surfactant. The composition can be easily emulsified to form an aqueous emulsion useful for paper sizing.

16 Claims, No Drawings

SIZING COMPOSITION

BACKGROUND OF THE INVENTION

1. Field of the Invention

This invention relates to a sizing composition. More particularly, it relates to an internal sizing composition for paper and a method for sizing paper products.

2. Description of the Prior Art

Hitherto, it has been proposed to use substituted cyclic dicarboxylic acid anhydrides as sizing agents in combination with emulsifiers, such as polyoxyethylene sorbitan trioleate, and polyoxyalkylene alkyl or alkyl-aryl ethers. Among these emulsifiers, the former has poor emulsifiability and requires complex high shear homogenizing equipments. On the other hand, the latters provide size mixtures easily emulsifiable with water, but sizing compositions containing the emulsifiers are of poor stability.

SUMMARY OF THE INVENTION

Accodingly, it is an object of the present invention to provide a sizing composition comprising a carboxylic acid anhydride and an emulsifier, which composition is stable even in admixture over extended period of time.

It is another object of this invention to provide a sizing composition which is easily emulsified with water even in the absence of high shearing forces and under normal pressure by merely stirring.

It is still another object of this invention to provide a method of sizing paper which will results in improved operability and improved sizing performance.

Briefly these and other objects of the invention as hereinafter will become more readily apparent have been attained broadly by providing a sizing composition which comprises:

(I) at least one acid anhydride (a) of the class consisting of those having the general formulae

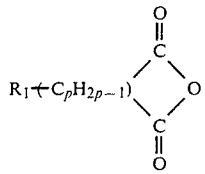

and

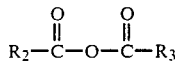

wherein $R_1$ and $R_2$ are hydrophobic groups containing more than 5 carbon atoms, selected from the class consisting fof alkyl, alkenyl, aralkyl and aralkenyl groups, $R_3$ is selected from the class consisting of alkyl, alkenyl, aralkyl and aralkenyl groups, p is an integer of 2 to 3; and (II) an emulsifier component comprising at least one emulsifier selected from the group consisting of (i) a blocked polyoxyalkylene compound (b) having the general formula

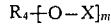

wherein $R_4$ is a residue of a polyoxyalkylene type nonionic surfactant, X is $-R_5$, $-CO-R_5$, $-CONH-R_5$ or $-CO-Q-COOM$, $R_5$ is a monovalent hydrocarbon group having 1 to 6 carbon atoms, Q is a residue of a dicarboxylic acid, M is a cation, m is an integer of 1 to 8; and (ii) a sulphur-containing anionic surfactant (c) in the form of an alkaline earth metal salt.

DETAILED DESCRIPTION OF THE PREFERRED EMBODIMENTS

[I] Acid Anhydride

In the general formulae (1) and (2), the hydrophobic groups $R_1$ and $R_2$ include, for example, alkyl, alkenyl, aralkyl and aralkenyl groups having 6-30 carbon atoms. Preferred are straight-chain and branched, alkyl and alkenyl groups, particularly those having 12-25 carbon atoms. Preferred p is 2. In the general formula (2), examples of $R_3$ are hydrophobic groups as above, and lower alkyl and alkenyl groups having 1-5 carbon atoms. Preferred are alkyl and alkenyl groups having 1-25 carbon atoms.

The acid anhydrides of the general formula (1) are fully described in U.S. Pat. No. 3,102,064 and No. 4,040,900.

Specific examples of such anhydrides are as follows:
(1) Alkenyl succinic anhydrides: Branched alkenyl succinic anhydrides [for instance, monoalkenyl succinic anhydrides, such as 1-methyl-2-pentadecenyl succinic anhydride, 1-ethyl-2-tetradecenyl succinic anhydride and 1-propyl-2-pentadecenyl succinic anhydride; and polyalkenyl succinic anhydrides, such as poly(4 to 10)propylene succinic anhydrides, poly(3 to 8)butylene succinic anhydrides and poly(3 to 6)isobutenyl succinic anhydride]; and straight-chain alkenyl succinic anhydrides [such as n-octadecenyl succinic anhydride, isooctadecenyl succinic anhydride, n-hexadecenyl succinic anhydride and eicosenyl succinic anhydride].

(2) Alkyl succinic anhydrides: Dodecyl succinic anhydride, n-hexadecyl succinic anhydride and the like.

(3) Alkyl glutaric anhydrides: Dodecyl glutaric anhydride, hexadecyl glutaric anhydride and the like.

Examples of suitable acid anhydrides represented by the general formula (2) are distearic anhydride, dipalmitic anhydride, acetic-stearic anhydride, and the like.

Among these acid anhydrides, preferred are alkenyl succinic anhydrides, more preferably branched alkenyl succinic anhydrides (particularly polyalkenyl succinic anhydrides), and mixtures of two or more of these.

[II] Emulsifier Component (II-1) Blocked Polyoxyalkylene Compound

The blocked polyoxyalkylene compounds (b) having the general formula (3) are polyoxyalkylene type nonionic surfactants, whose hydroxyl group or groups have been blocked or substituted with substituent X. The substituent X may be $-R_5$, $-CO-R_5$, $-CONH-R_5$, $-CO-Q-COOM$, or two or more of these substituents.

$R_5$ is a monovalent hydrocarbon group and must have at most 6 carbon atoms. Suitable hydrocarbon groups include, for example, alkyl groups such as methyl, ethyl, n-propyl, isopropyl, butyl and pentyl group; and alkenyl groups such as allyl group. Preferred are methyl and ethyl, particularly methyl.

Use of compounds having monovalent hydrocarbon radicals (such as alkyl groups) containing more than 6 carbon atoms, instead of $R_5$, results in poor emulsifiability.

Q is a residue of a dicarboxylic acid, from which two carboxylic groups are eliminated. Suitable dicarboxylic acids include, for example, saturated and unsaturated aliphatic dicarboxylic acids, generally containing 4 to 8 carbon atoms, such as maleic acid, itaconic acid and succinic acid; and aromatic dicarboxylic acids, such as phthalic acid.

Suitable examples of cations M include, H and alkali metals, such as Na and K.

In the general formula (3), $R_4$ represents a residue of a polyoxyalkylene type nonionic surfactant, from which hydroxyl group or groups are eliminated.

As the polyoxyalkylene type nonionic surfactants, constituting the residue $R_4$, there may be mentioned those having the general formula $$R_6\text{--}[(AO)_n\text{--}H]_m \quad (4)$$

wherein $R_6$ is a residue of an active hydrogen atom-containing compound, A is an alkylene group of 2 to 4 carbon atoms, n is an integer of at least 1, m is an integer from 1 to 8.

In the general formula (4), $R_6$ represents a residue of an active hydrogen atom-containing compound, from which active hydrogen atom or atoms are eliminated.

There may be used any active hydrogen atom-containing compounds, capable of reacting with alkylene oxides to form polyoxyalkylene type nonionic surfactants, and there can be mentioned phenols, alcohols, carboxylic acids, amines, mercaptans and amides.

Suitable phenols include, for instance, those having the general formula (5)

$$Ar\text{--}(OH)_q \quad (5)$$

wherein q is an integer of 1 to 3, and Ar is a benzene- or naphthalenenucleus, which may be substituted with at least one group selected form alkyl groups having 1-15 carbon atoms,

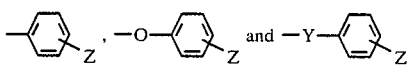

wherein Z is hydrogen, hydroxyl, an alkyl group having 1 to 15 carbon atoms, and Y is an alkylene group having 1-5 carbon atoms or a fluorosubstituted alkylene group having 1-5 carbon atoms; and those prepared by reacting the compounds of the formula (5) with styrene or a substituted styrene such as α-methylstyrene. Illustrative examples of the phenols are single phenols such as phenol, alkylphenols and polyhydric phenol, and poly-ring phenols such as phenylphenol, cumylphenol, benzylphenol, hydroquinone monophenyl ehter, naphthol, and bisphenols (such as bisphenol A); and styrenated phenols obtained by reacting 1 mole of these phenols with about 1 to 20 moles, preferably 1 to 10 moles, of styrene or α-methylstyrene.

Suitable examples of alcohols include natural and synthetic, saturated and unsaturated, straight-chain and branched aliphatic alcohols having usually 8-20 preferably 12-18 carbon atoms, such as Ziegler alcohols having 6 to 20 carbon atoms, octyl alcohol and hydrogenated coconut oil alcohol; and polyhydric alcohols having 2-8 hydroxyl groups, including alkane polyols such as ethylene glycol, propylene glycol, butylene glycol, hexane diol, glycerol, trimethylol propane, hexane triol, pentaerithritol, sorbitol, and intramolecular anhydrides of them, such as sorbitan, and sugars such as sucrose. Other examples of alcohols are partial esters of these polyhydric alcohols with fatty acids having usually 8-20 preferably 12-18 carbon atoms, such as those described bellow.

Examples of suitable carboxylic acids include saturated and unsaturated fatty acids having generally 8-20 preferably 12-18 carbon atoms, such as lauric, stearic and oleic acids; polycarboxylic acids having 4-36 carbon atoms and 2-4 carboxyl groups, such as succinic aid, maleic acid, and the like, as well as dimer acids (such as dimerized rinoleic acid) and; hydroxycarboxylic acids having 10-20 carbon atoms such as ricinoleic acid and the like.

Exemplary of suitable amines are monoamines, including alkyl amines having 8-20 carbon atoms such as stearylamine, and polyamines such as C2-6 alkylene diamines (ethylene diamine and the like) and polyalkylene (C2-6) polyamines (diethylene triamine and the like). Examples of suitable mercaptans are alkyl mercaptans having 8-20 carbon atoms such as octyl mercaptan. Suitable amides include, for example, alkylol amides having the general formula (6)

wherein R' is a hydrocarbon radical having 5-20 carbon atoms, R'' is a hydroxyalkyl group having 2-4 carbon atoms, R''' is H, hydroxyalkyl group having 2-4 carbon atoms or a hydrocarbon radical having 1-18 carbon atoms. Example of such alkylol amides are reaction products of fatty acids with mono- or di-ethanol amine, such as lauric acid diethanol amide.

Among these active hydrogen atom-containing compounds, preferred are phenols, particularly alkyl phenols and alkyl naphthols (having 8-12 carbon atoms in the alkyl group), styrenated phenols [reaction products of styrene(1-20 moles) with mono- and poly-cyclic phenols (phenol, C1-12 alkyl phenols, phenyl phenols, cumyl phenol, naphthols and C1-12 alkyl naphtols)]; alcohols, particularly aliphatic alcohols (especially those having 12-18 carbon atoms); and fatty acids (especially those having 12-18 carbon atoms). Most preferred are alkyl phenols and especially styrenated phenols.

The polyoxyalkylene type nonionic surfactants having the general formula (4) may be adducts of one or more active hydrogen atom-containing compounds with one or more alkylene oxides. Suitable alkylene oxides include ethylene oxide, propylene oxide, 1,2-, 1,3-, 2,3- and 1,4-butylene oxides; and combinations of two or more of these alkylene oxides (such as combination of ethylene oxide and propylene oxide). Preferred are ethylene oxide, and combinations of ethylene oxide with other oxide (particularly propylene oxide) (weight ratio 100:0–10:90 preferably 100:0–40:60).

Amounts and kinds of the alkylene oxides may vary widely, so far as nonionic surfactants can be obtained. In case the active hydrogen atom-containing compound has a hydrophobic group (a hydrocarbon radical having 8 or more carbon atoms), usually 2-50 moles of alkylene oxides mainly consisting of ethylene oxide (ethylene oxide, or combination thereof with minor amount of the other oxide such as propylene oxide) are added to 1 mole (equivalent) of the active hydrogen atom-containing compound. Preferred amounts (moles per mole of active hydrogen atom-containing compound) of the alkylene oxides are 5–20 moles in case of those having a relatively lower hydrophobic group, such as alkyl phenols, fatty alcohols, fatty acids, alkyl amines, alkyl mercaptans, and fatty acid alkylol amides, and 5–40 moles in case of those having a higher hydrophobic group, such as styrenated phenols and fatty esters of polyhydric alcohols. On the other hand, when the active hydrogen atom-containing compound are those having no hydrophobic group, such as polyhydric alcohols, polycarboxylic acids and polyamines, generally both ethylene oxide and higher alkylene oxides such as propylene oxide are added (preferably block-addition), and total amounts of the alkylene oxides are usually 10–500 moles preferably 15–400 moles per moles of the active hydrogen atom-containing compounds. Exemplary of adducts of such alkylene oxides are ethylene oxide adducts of polypropylene glycol having average molecuar weight of 900–2900. Content of ethylene oxide in the molecule (the resulting polyoxyalkylene type nonionic surfactant) is usually 10–80% preferably 40–80% by weight.

Specific examples of these nonionic surfactants having the formula (4) are shown in column B of Table I.

The blocked polyoxyalkylene compounds (b) having the general formula (3) may be prepared by reacting said nonionic surfactants of the formula (4) with one or more etherifying agents, acylating agents and carbomoylating agents. Examples of suitable etherifying agents, including alkylating and allylating agents, are alkyl halides (such as methyl chloride and ethyl chloride), dialkyl sulfates (such as dimethyl sulfate and diethyl sulfate) and allyl halides (such as allyl chloride and allyl bromide). Suitable acylating agents include, for example, monocarboxylic acids having 2 to 7 carbon atoms, dicarboxylic acids having 4 to 8 carbon atoms, and anhydrides and halides of these acids [such as acetic, propionic, maleic, itaconic and succinic acids, and corresponding anhydrides, acetyl chloride and propionyl chloride]. When a dicarboxylic acid or anhydride is used for blocking, free carboxyl group of the resulting product (half ester) may be neutralized with an alkali such as sodium hydroxide. Suitable carbamoylating agents include, for example, alkyl monoisocyanates (shch as methyl isoyanate and ethyl isocyanate) and allyl monoisocyanate.

The compounds (b) represented by the general formula (3) may also be prepared by reacting alkylene oxide adducts of monohydric alcohols [$R_5OH$] with fatty acids having 8 to 20 carbon atoms, dicarboxylic acids having 4 to 8 carbon atoms or anhydrides of these acids, or organic polyisocyanates (including aromatic, aliphatic and cycloaliphatic polyisocyanates having 4–15 carbon atoms) such as tolylene-, diphenylmethane-, hexamethylene, lysine-, isophorone- and dicyclohexylmethane-diisocyanates.

Among said blocked polyoxyalkylene compounds (b), preferred are those having HLB value of 5–20 particularly 10–20.

Illustrative examples of the blocked polyoxyalkylene compounds (b) are those derived from the nonionic surfactants of the formula (4) enumerated in column B of Table I, hydroxyl groups of which have been blocked (alkylated, acetylated or carbamoylated) to form derivatives [alkyl ethers, acetates, or alkylcarbamates (urethanes)] as written in column A of Table I.

[Hereinafter, AO stands for alkylene oxide containing 2 to 4 carbon atoms, EO for ethylene oxide, PO for propylene oxide, and PPG for polypropylene glycol. The numerical parenthesis stands for the number of moles. For instance, the expression "styrenated (2) phenol-PO(10)EO(25)PO(3)" means a product of obtained by block-addition of 10 moles of PO, 25 moles of EO and 3 moles of PO in this order to a reaction product of 1 mole of phenol with 2 moles of styrene. Parts and % designate parts by weight and % by weight, respectively, unless otherwise specified.]

TABLE I

| No. | Column A | Column B |
|---|---|---|
| 1 | Acetates of | styrenated(2)phenol-EO(10) |
| 2 | | styrenated(2)phenol-EO(7)PO(2) |
| 3 | | styrenated(2)phenol-EO(20)PO(3) |
| 4 | | styrenated(2)phenol-PO(10)EO(25) |
| 5 | | styrenated(2)phenol-PO(10)EO(25)PO(3) |
| 6 | | styrenated(2)phenol-EO(17)PO(2) |
| 7 | | styrenated(2)phenol PO(10)EO(30)PO(3) |
| 8 | | nonylphenol-EO(20) |
| 9 | | nonylphenol-EO(10) |
| 10 | | nonylphenol-EO(8) |
| 11 | | dodecylphenol-EO(10) |
| 12 | | $C_{12-14}$ Ziegler alcohol-EO(8) |
| 13 | | cetyl alcohol-EO(10) |
| 14 | | octyl alcohol-EO(10) |
| 15 | | stearic acid-EO(15) |
| 16 | | oleic acid-EO(15) |
| 17 | | PPG(MW1200)-EO(40%) |
| 18 | | PPG(MW1750)-EO(50%) |
| 19 | | glycerin-EO/PO (weight ratio 1/1, random)* |
| 20 | | Tetronics 304, 704 and 707 (Wyandotte) |
| 21 | | bisphenol A-EO(8) |
| 22 | | castor oil-EO(30) |
| 23 | | stearylamine-EO(10) |
| 24 | | cetylmercaptan-EO(10) |
| 25 | | lauric acid diethanolamide |
| 26 | | sorbitan monooleate-EO(35) |
| 27 | Methyl ethers of | styrenated(2)phenol-PO(10)EO(25) |
| 28 | | nonylphenol-EO(10) |
| 29 | | octylphenol-EO(10) |
| 30 | | $C_{12-14}$ Ziegler alcohols-EO(8) |
| 31 | | lauric acid-EO(10) |
| 32 | Ethyl ether of | nonylphenol-EO(10) |
| 33 | Propyl ether of | nonylphenol-EO(10) |
| 34 | Methyl carbamates of | nonylphenol-EO(10) |
| 35 | | nonylphenol-EO(18)PO(2) |
| 36 | | stearic acid-EO(15) |
| 37 | | octylphenol-EO(15) |
| 38 | | hydrogenated coconut oil alcohol-EO(10) |
| 39 | | styrenated(5)phenol-EO(17)PO(2) |
| 40 | Half maleate of | nonylphenol-EO(10) |

Note: *MW 2800

(II-2) Anionic Surfactant in the Form of Alkaline Earth Metal Salt

The sulphur-containing anionic surfactants (c) in the form of alkaline earth metal salts, used instead of or in conjunction with said blocked polyoxyalkylene compound (b), include those of sulfonic acid type and sulfate ester type.

Examples of suitable sulfonic acids are as follows:
(1) Alkylbenzene sulfonic acids having one or more branched or straight-chain alkyl groups (generally C8-20, preferably C10-18), such as dodecylbenzene sulfonic acid and undecyl benzene sulfonic acid;
(2) Alpha-olefinsulfonic acids (generally C8-20 preferably C10-18), such as those of C12-16;
(3) Sulfosuccinate esters[esters of sulfosuccinic acid with alcohols (usually C6-20)], for example, dialkyl sulfosuccinates such as di-2-ethylhexylsulfosuccinate, and dicycloalkyl sulfosuccinates such as dicyclohexyl sulfosuccinate;
(4) Naphthalenesulfonic acids, and alkyl naphthalene sulfonic acids having one or more alkyl groups (C1-18), such as diisopropylnaphthalene sulfonic acids, as well as condensation products of these with formaldehyde (polycondensation degree: generally 1 to 20, preferably 1 to 8);
(5) Alkanesulfonic acids (generally C8-20), such as tetradecyl sulfonic acid; and
(6) Fatty acid (C10-20) amide sulfonic acids (such as N-methyl oleylamidoethyl sulfonic acid), petroleum sulfonic acids, ligninsulfonic acid, and so on.

Suitable sulfate esters include, for example:
(1) Alkyl sulfates: sulfate esters of straight-chain and/or branched, saturated and/or unsaturated alcohols (generally C6-20 preferably C12-18), such as decyl sulfate, lauryl sulfate, sulfates of C11-12oxo alcohols having a side chain content of 50% or more, and sulfated alpha-olefines (usually C12-18) such as Teepol (Shell);
(2) Polyoxyalkylene alkyl sulfates[sulfate esters of AO adducts of straight-chain and/or branched, saturated and/or unsaturated alcohols (generally C6-20 preferably C12-18), containing usually 2 to 50 moles, preferably 2 to 20 moles of AO per mole of the alcohol] such as sulfates of decylalcohol-EO(1), lauryl alcohol-EO(4) and cetyl alcohol-EO(8);
(3) Polyoxyalkylene alkylaryl ether sulfates[sulfate esters of AO adducts of alkyl phenols having at least one alkyl group (generally C8-12) containing usually 2-50 moles preferably 2-20 moles per mole of said phenol], such as nonylphenol-EO(2) sulfate ester;
(4) Fatty ester sulfates [sulfates of saturated and/or unsaturated fatty acid (C10-20) esters (suh as mono-, di- and tri-glycerides, and lower and higher alkyl esters)], for example, monoglyceride sulfates such as coconut oil fatty acid monoglyceride sulfate, sulfated oils (including highly sulfated oils) such as turkey red oil, and sulfated fatty acid esters such as sulfated methyloleate;
(5) Fatty acid alkylamide sulfates[sulfates of saturated or unsaturated fatty acid usually C10-20) alkylol (C2-4) amides], such as coconut oil fatty acid monoethanolamide sulfate; and
(6) Sulfated fatty acids (usually C10-20) such as sulfated oleic acid, and the like.

Among these anionic surfactants, preferred are alkylbenzenesulfonic acids, alpha-olefin sulfonic acids and alkyl sulfate esters.

Alkaline earth metals forming salts with these anionic surfactants include calcium, magnesium, beryllium, strontium and barium. Perferred among these are magnesium and particularly calcium.

(II-3) Other Surfactants

In addition to said emulsifiers (b) and (c), other surfactants such as nonionic surfactants and anionic surfactants may be used if necessary.

Other nonionic surfactants, optionally used, include those of unblocked polyoxyalkylene type and polyhydric alcohol fatty ester type.

Examples of the unblocked polyoxyalkylene type nonionic surfactants include those of the general formula (4) as described above, which may be partly blocked.

The polyhydric alcohol fatty esters include, for example, partial esters and complete esters of polyhydric alcohols having 3-8 hydroxyl groups (such as glycerin, pentaerythritol, sorbitol, sorbtan, sucrose, and the like) with C 8-20 fatty acids (such as lauric acid monoglyceride, sorbitan mono- or sesqui-stearate and sucrose mono- or di-stearate; and sorbitan trioleate and sorbitan tristearate]; and blocked compounds of the above-mentioned partial esters, whose active-hydrogen atoms have been blocked or substituted with X defined with respect to the formula (3), such as reaction products of the above partial esters with aforesaid etherifying, acylating and carbamoylating agents; as well as complete esters of polyoxyalkylene polyols having 3-8 hydroxyl groups with C 8-20 fatty acids, such as polyoxyethylene sorbitan tristearate and polyoxyethylene sorbitol hexaoleate.

Among these, preferred are those having an HLB of 5 to 20, particularly 10 to 20.

Nonionic surfactants having active hydrogen atom-containing groups (such as hydroxyl groups) other than carboxyl group (such as unblocked polyoxyalkylene nonionic surfactants and partial esters) are used preferably in combination with said anionic surfactants (c) and not with said blocked polyoxyalkylene compounds (b).

Among these nonionic surfactants, preferred are polyoxyalkylene alkylaryl ethers, polyoxyalkylene styrenated aryl ethers, polyoxyalkylene alkyl ethers, and combinations of two or more of these.

Other anionic surfactants, which may be used if necessary, include, for instance, alkali metal salts (such as Na and K salts) of above-mentioned sulphur-containing anionic surfactants, including those of sulfonic acid type and sulfate ester type; and carboxylate type anionic surfactants, such as alkali metal salts of saturated or unsaturated fatty acids (generally C 6-20 preferably C 12-18), and ether carboxylates (reaction products of the above-mentioned unblocked nonionic surfactants with C 2-5 monohalofatty acids such as monochloroacetic acid).

[III] Composition

In the sizing composition of the present invention, contents of the component (I) [said acid anhydride (a)] and the emulsifier component (II) [at least one of (b) and (c), and optionally other surfactants] may vary widely. In view of sizing performance and emulsifiability, (I) is used in an amount of usually 75-99%, preferably 80-97%, more preferably 83-95%, and (II) is used in an amount of usually 1-25%, preferably 3-20%, more preferably 5-17%, based on the weight of the sizing composition.

The amounts of (b) and (c) in the emulsifier component (II) may vary widely. In general, the amount of (b) can be varied from 0 to 100%, preferably at least 20%, more preferably at least 50%, that of (c) may be usually at most 80%, preferably 20 to 50%; and the total amount of (b) and (c) is generally at least 10%, preferably at least 40%.

As an aspect of the present invention, said blocked polyoxyalkylene compound (b) is used as an essential component. In this aspect, the compound (b) can be used in an amount of 0.05-20%, preferably 1-15%, based on the weight of the anhydride (a). The compound (b) may be used in conjunction with one or more other surfactants as described in the above (II-3), including anionic surfactants, such as those of sulfonic type and of sulfate ester type, in the form of alkaline earth metal salts and others (e.g. alkali metal salts), and those of carboxylate type, as well as other nonionic surfactants having no active hydrogen atom. These anionic surfactants may be used in an amount of generally at most 80% preferably at most 50%, based on the weight of the component (II). Weight ratio of (b) to the other nonionic surfactants is usually 100:0–50:50, preferably 100:0–70:30.

As another aspect of this invention, said anionic surfactant (c) in the form of an alkaline earth metal salt is used as an important component. In view of self-emulsifiability, it is preferred to use (c) in an amount of 0.05–20%, especially 1–15%, based on the weight of (a). In general, the surfactant (c) is used in combination with one or more nonionic surfactants, such as said blocked polyoxyalkylene compound (b), unblocked polyoxyalkylene type nonionic surfactants and polyhydric alcohol fatty ester type nonionic surfactants, as described above. The amount of these nonionic surfactants is generally 20–90%, preferably 50–80%, and that of the anionic surfactant (c) is usually 10–80% preferably 20–50%, based on the weight of the component (II).

[IV] Sizing Emulsion

The sizing composition of the present invention can be used for paper sizing in the form of an aqueous emulsion. The aqueous emulsion may be prepared by any known emulsification techniques.

Examples of such emulsification methods are as follows:

(i) All of the emulsifier component and the acid anhydride (a) are premixed without water, and then the resulting size mixture is added to water and emulsified.

(ii) The emulsifier component is dispersed into water and subsequently (a) is added and emulsified.

(iii) A part of the emulsifier and (a) are mixed and then dispersed into water, followed by adding the rest of the emulsifier and emulsifying them.

(iv) A part of the emulsifier is dispersed into water, and subsequently a mixture of (a) with the rest of the emulsifier is added and emulsified.

Among these, preferred is method (i), because this is the most simplest method and there can be attained emulsions of smaller particle size and excellent sizing effect for paper, with use of only a small quantity of the emulsifier.

The amount of the sizing composition added to water may vary widely, but it is usual to add in sufficient quantity so as to yield an emulsion containing said anhydride (a) in a concentration of about 0.1–20%.

These methods may be carried out either by forming a sizing emulsion and subsequently adding it to stock system, or by adding the ingredients of the size mixture directly to stock system [namely using stock system as water (or instead of water) in the above methods (i)–(iv)].

Emulsification may be conducted by using emulsifying equipments such as homomixers, high pressure homogenizers, ultrasonic homogenizers and turbine mixers; but the sizing compositions, particularly those containing said anionic surfactant (c), can be emulsified by merely stirring, without using such complex high shear equipments, using simple stirrers such as in-line mixers, propeller-type stirrers and paddle-type stirrers, or by usual agitation present in a stock preparation system.

The sizing compositions of this invention may be successfully utilized for sizing of paper (including sheets and molded products) prepared from all types of both cellulosic fibers (those derived from natural and synthetic resources) and combinations of cellulosic with non-cellulosic fibers [for example, synthetic fibers such as polyamide, polystyrene, polyester and polyacrylic resin fibers, and mineral fibers derived from asbestos and glass], as well as those prepared from non-cellulosic fibers alone. Examples of such paper include general-purpose paper, such as printing paper, writing paper and wrapping paper; specialty paper, and paper board; as well as building materials such as wall materials and ceiling materials.

In carrying out paper sizing, there may be employed any known methods, such as those described in U.S. Pat. No. 4,040,900 and No. 3,102,064.

The ingredients of the sizing composition, which may be premixed or not and may be pre-emulsified or not, can be dispersed within a paper stock system or wet pulp, prior to the ultimate conversion of the pulp into a dry web. For example, they may be added to the paper stock system during the stock is in the head box, beater, hydropulper or stock chest, or to the wet end of the paper making machine. The size emulsion may also be sprayed onto the surface of the formed web at any point prior to the drying step.

The amount of size will vary depending on conditions, type of pulp and end use of paper, but it is added so as to provide a concentration of the anhydride (a) of usually 0.01–5% preferably 0.05–2%, based on dry fiber weight.

The sizing composition of this invention can be used in conjunction with cationic agents useful for aiding the retention of the anhydride (a) as well as for bringing (a) into close proximity to the pulp fibers. Suitable cationic agents include, for example, inorganic cationic compounds of polyvalent metals (aluminum and the like), such as alum, aluminum chloride and sodium aluminate; and cationic polymers, such as various cationic starch derivatives, polyamine-polyamide-epichlorohydrin polymers, cyclic polymers of diallylammonium halides, polyvinyl pyridines and various cationic polyacrylamides and the like. Any of the above mentioned cationic retention agents may be added to the stock, i.e. the pulp slurry, either prior to, along with or after the addition of the sizing compositions (or size emulsions). It is preferred to add the cationic agents subsequent to the sizing compositions, in order to attain the maximum distribution. The cationic agent can be added to the stock system in an amount of usually at least 0.01%, preferably 0.025–3%, based on dry fiber weight.

All types of pigments and fillers may be added to the paper which is to be sized with the sizing compositions of this invention. Such materials include calcium carbonate, talc, clay, titanium dioxide, and calcium sulfate. Stock additives such as defoamers, pitch dispersants, slimicides, etc. as well as other sizing compounds (such as rosins, petroleum resins, alkyl ketene dimers and paraffin wax) may also be used with the sizing compositions of this invention.

Subsequent to the addition of the size mixture (or size emulsion) and retention aid, wet web is formed and dried on the paper making machine in the usual manner, heating the web generally at temperatures in the range of from 70° C. to 150° C.

The sizing composition comprising said acid anhydride (a) and said blocked polyoxyalkylene compound (b) according to this invention are stable over a long period of time, and are able to provide stable and uniform size emulsions without decreasing their emulsifiability, even when used after stored for six months, for example. Consequently, this makes it possible to manufacture, store and use the size compound and the emulsifier in the form of mixtures which can be easily and quickly emulsified, and eliminate drawback of known sizing compositions composed of (a) and unblocked nonionic surfactants which must be used up within a short time. In addition, the compositions comprising (a) and (b) have improved emulsifiability, as compared with those containing (a) and polyoxyalkylene nonionic surfactants blocked with higher fatty acyl groups.

The sizing compositions comprising (a) and said anionic surfactant (c) in the form of alkaline earth metal salts are also stable and similar effects as above.

Moreover, the sizing compositions comprising (a), (c) and other emulsifiers [(b) and other nonionic surfactants] can be easily emulsified into water merely by stirring with moderate speed agitation and without need for using of high price and complex emulsifying equipments of high shearing force type such as homomizers, high pressure homogenizers and turbine mixers. The resulting emulsions have small particle size (almost all particles are of less than 3 microns), and exhibit excellent sizing performance. Furthermore, merely by adding the sizing composition directly to paper stock system at an intake of fun pump or screen inlet in sheeting system, the composition can be easily emulsified and dispersed in paper stock; and this can eliminate complicated procedures and use of complex high performance emulsifying equipments, and there can be attained a remarkable reduction of contact time of said anhydride (a) with water and accordingly excellent sizing effects without reducing effective reactive groups in (a).

Having generally described the invention, a more complete understanding can be obtained by reference to certain specific examples, which are included for purposes of illustration only and are not intended to be limiting unless otherwise specified.

In the examples, parts and % designate parts by weight and % by weight, respectively. In the following, Compounds Nos. 5–40 represent the blocked polyoxyalkylene compounds in Table I, having the corresponding numbers; and Unblocked compounds Nos. 1–39 represent the nonionic surfactants, written in column B of Table I, having the corresponding numbers.

EXAMPLES 1 TO 12

Alkenyl succinic anhydrides prepared by reacting straight chain inner olefins (mainly composed of β- and γ-olefins) containing 14 to 20 carbon atoms were uniformly mixed with 5%, based on the weight of the alkenyl succinic anhydride, of each emulsifier written in Table II, followed by allowing to stand at 30° C. for five hours. Then each mixture was diluted with water, and emulsified using a loboratory high speed mixer.

Particle size of the resulting size emulsions was measured according to coal counter method, as distribution of particle size of at least 90%.

Using these size emulsion in an amount of 0.2% or 0.3% of the size based on the weight of dry pulp, neutral paper sheets were prepared under the following conditions:

| Pulp | LBKP 100%, 430 c.s.f. |
|---|---|
| Areal dried weight | 70 g/m$^2$ |
| Ash content | 20% |
| Filler | Heavy calcium carbonate |
| Retention agent | Cationic starch |
| Paper machine | Tappi square-shaped paper machine |
| Drying | 105° C., 2 minutes |

Stöckigt sizing degree of neutral paper sheets thus formed was measured according to JIS P-8122.

These results were as shown in Table II.

Sizing compositions of this invention (Examples 1 to 9) exhibited a good emulsion state having a particle size of emulsion of 0.5 to 8 micron and sizing effect, while sizing compositions containing the conventional emulsifiers (Examples 10 to 12) resulted in unsatisfied emulsifiability and sizing effect.

TABLE II

| Example No. | Emulsifiers | Particle size of emulsion (μ) | Stockigt sizing degree (sec.) 0.2% size | Stockigt sizing degree (sec.) 0.3% size |
|---|---|---|---|---|
| 1 | Compound No. 9 | 0.5–3 | 27 | 32 |
| 2 | Compound No. 13 | 0.5–3 | 28 | 33 |
| 3 | Compound No. 28 | 0.5–3 | 25 | 31 |
| 4 | Compound No. 32 | 1–4 | 26 | 34 |
| 5 | Compound No. 6 | 0.5–3 | 28 | 30 |
| 6 | Compound No. 15 | 1–3 | 25 | 30 |
| 7 | Compound No. 34 | 1–4 | 25 | 30 |
| 8 | Compound No. 40 | 1–4 | 24 | 29 |
| 9 | Compound No. 33 | 2–4 | 24 | 29 |
| 10 | SMOE*[1] | *[2] | 0 | 0 |
| 11 | Unblocked compound No. 9 | *[2] | 0 | 0 |
| 12 | Unblocked compound No. 15 | *[2] | 0 | 0 |

[Notes]
*[1]Sorbitan monooleate - EO(10)
*[2]separated into two phases on standing, because of poor emulsifiability

EXAMPLES 13 TO 22

Alkenyl succinic anhydrides derived from straight chain internal olefins containing 15 to 20 carbon atoms, were mixed uniformly with each emulsifier written in Table III.

Each mixture was added into water and dispersed uniformly with the use of a laboratory stirrer, to obtain a size emulsion containing 0.5% of the alkenyl succinic anhydrides.

Appearance (visual check) and particle size (by coal counter method) of the resulting size emulsions were obserbed.

Using these size emulsions in an amount of 0.1 to 0.3% of the size, based on the weight of the dry pulp, neutral paper sheets were prepared under the same conditions as in Example 1 to 12 excepting that the areal dried weight was 75 g/m$^2$.

Sizing performance was measured by Stöckigt sizing degree of paper (JIS P-8122).

These results are shown in Table IV.

TABLE III

| Example No. | Emulsifiers | Amount of emulsifier*[7] (%) |
|---|---|---|
| 13 | DBS - Ca*[3] | 6 |
|  | Unblocked compound No. 35 | 4 |
|  | Unblocked compound No. 9 | 5 |
| 14 | DBS - Ca | 6 |
|  | Unblocked compound No. 5 | 4 |
|  | Unblocked compound No. 12 | 5 |
| 15 | DBS - Ca | 6 |
|  | Unblocked compound No. 22 | 4 |
|  | Unblocked compound No. 1 | 5 |
| 16 | DBS - Ca | 5 |
|  | Unblocked compound No. 3 | 5 |

TABLE III-continued

| Example No. | Emulsifiers | Amount of emulsifier*7 (%) |
|---|---|---|
|  | Compound No. 9 | 5 |
| 17 | AOS - Ca*4 | 6 |
|  | Compound No. 15 | 4 |
|  | Compound No. 26 | 5 |
| 18 | LAS - Ca*5 | 6 |
|  | Unblocked compound No. 39 | 4 |
|  | Unblocked compound No. 10 | 5 |
| 19 | DBS - Ca | 5 |
|  | Compound No. 5 | 5 |
|  | Compound No. 12 | 5 |
| 20 | DBS - Ca | 5 |
|  | Compound No. 7 | 5 |
|  | Compound No. 9 | 5 |
| 21 | Unblocked compound No. 9 | 15 |
| 22 | SLE*6 | 15 |

*3 Dodecylbenzene sulfonic acid Ca salt
*4 Alpha-olefin (C 12-16) sulfonic acid Ca salt
*5 Lauryl sulfate Ca salt
*6 Sorbitan monolaurate-EO(10)
*7 based on the weight of the alkenyl succinic anhydrides.

TABLE IV

| Example No. | Properties of emulsion | | Stockigt sizing degree (sec.) | | |
|---|---|---|---|---|---|
|  | Appearance | Particle size (μ) | Amount of size | | |
|  |  |  | 0.1% | 0.2% | 0.3% |
| 13 | Milk-white | 0.5–3 | 4 | 35 | 50 |
| 14 | Slightly bluish milk-white | 0.5–3 | 4 | 36 | 52 |
| 15 | Milk-white | 0.5–4 | 6 | 38 | 53 |
| 16 | Milk-white | 0.5–4 | 5 | 37 | 52 |
| 17 | Milk-white | 1–8 | 2 | 32 | 45 |
| 18 | Milk-white | 2–10 | 0 | 30 | 42 |
| 19 | Slightly bluish milk-white | 0.5–3 | 4 | 36 | 52 |
| 20 | Slightly bluish milk-white | 0.5–3 | 4 | 36 | 52 |
| 21 | Slightly brownish white | 5–30 | 0 | 0 | 6 |
| 22 | Slightly brownish white | 5–30 | 0 | 0 | 7 |

EXAMPLES 23 AND 24

Examples 1 to 12 were repeated except that the following emulsifiers were used.

Particle size of the resulting size emulsions and Stöckight sizing degree of paper were as follows.

TABLE V

| Example | Emulsifiers | Particle size of emulsion (μ) | Stockigt sizing degree (sec.) | |
|---|---|---|---|---|
|  |  |  | 0.2% size | 0.3% size |
| 23 | 1:1:1 mixture of DBS - Ca, Compound No. 5 and Compound No. 12 | 0.5–3 | 32 | 37 |
| 24 | 1:1:1 mixture of DBS - Ca, Compound No. 7 and Compound No. 9 | 0.5–3 | 32 | 37 |

What is claimed as new and desired to be secured by Letter Patent is:

1. A sizing composition, which comprises:

(I) from 75 to 99% by weight of at least one acid anhydride (a) of the class consisting of those having the formulas:

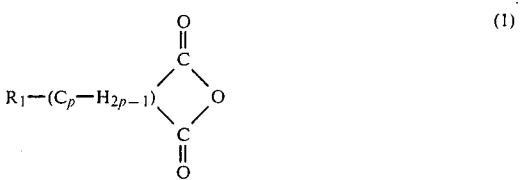

and

wherein $R_1$ and $R_2$ are hydrophobic groups containing more than 5 carbon atoms, selected from the class consisting of alkyl, alkenyl, aralkyl and aralkenyl groups, $R_3$ is selected from the class consisting of alkyl, alkenyl, aralkyl and aralkenyl groups, p is an integer of 2 to 3; and (II) from 1 to 25% by weight of an emulsifier component comprising a blocked polyoxyalkylene compound (b) having the formula:

wherein $R_4$ is a residue of a polyoxyalkylene nonionic surfactant, said nonionic surfactant being at least one polyoxyalkylene compound selected from the group consisting of oxyalkylene derivatives of phenols, alcohols, carboxylic acids, amines, mercaptans and amides, X is $-R_5$, $-OC-R_5$, $-CONH-R_5$ or $-CO-Q-COOM$, where $R_5$ is a monovalent hydrocarbon group having 1 to 6 carbon atoms, Q is a residue of a dicarboxylic acid having 4–8 carbon atoms, M is a cation, and m is an integer of 1 to 8.

2. The sizing composition of claim 1, wherein said emulsifier component further comprises a sulfur-containing anionic surfactant (c) in the form of an alkaline earth metal salt, said anionic surfactant being selected from the group consisting of sulphonic acids and sulfate esters.

3. The composition of claim 1, wherein said alcohol is at least one selected from the group consisting of aliphatic alcohols having 8–20 carbon atoms, and polyhydric alcohols having 2–8 hydroxyl groups.

4. The composition of claim 1, wherein said carboxylic acid is at least one selected from the group consisting of fatty acids and hydroxycarboxylic acids, having 8–20 carbon atoms.

5. The composition of claim 1, wherein said nonionic surfactant is at least one nonionic compound selected from the group consisting of polyoxyalkylene styrenated aryl ethers, polyoxyalkylene alkylaryl ethers, polyoxyalkylene alkyl ethers, polyoxyalkylene fatty acid esters, polyoxyalkylene polyols, polyoxyalkylene alkylamines, polyoxyalkylene alkylmercaptans and alkylolamide type nonionic surfactants.

6. The composition of claim 1, wherein said anionic surfactant is at least one sulfonic acid selected from the group consisting of alkylbenzenesulfonic acids, alpha-olefinsulfonic acids, sulfosuccinates, naphthalene- or alkylnaphthalene-sulfonic acids, condensation products thereof with formaldehyde, and alkane sulfonic acids.

7. The composition of claim 2, wherein said anionic surfactant is at least one sulfate ester selected from the group consisting of alkyl sulfates, polyoxyalkylene alkyl sulfates, polyoxyalkylene alkylaryl ether sulfates, fatty ester sulfates, fatty acid alkylol amide sulfates, and sulfated fatty acids.

8. The composition of claim 2, wherein the emulsifier component comprises 20–100% by weight of said blocked polyoxyalkylene compound (b) and 0–80% by weight of said anionic surfactant (c).

9. The composition of claim 1, wherein the emulsifier component comprises
   (1) 20–100% by weight of said blocked polyoxyalkylene compound (b); and
   (2) 0–80% by weight of at least one anionic surfactant selected from the group consisting of sulfonic acid type anionic surfactants, sulfate ester type anionic surfactants, and carboxylate type anionic surfactants.

10. The composition of claim 1, wherein said phenol is at least one selected from the group consisting of a compound having the formula (5)

$$Ar-OH)_q \qquad (5)$$

wherein q is an integer of 1 to 3, Ar is benzene nucleus or naphthalene nucleus, which nucleus may be substituted with at least one member selected from the group consisting of an alkyl group having 1 to 15 carbon atoms,

wherein Z is H, OH or an alkyl group having 1 to 15 carbon atoms, and Y is an alkylene group having 1 to 5 carbon atoms or a fluoro-substituted alkylene group having 1 to 5 carbon atoms; and a reaction product of a compound having the formula (5) with at least one compound selected from the group consisting of styrene and a substituted styrene.

11. The sizing composition of claim 2, wherein said emulsifier component comprises at least 10%, based on the weight of the component, of the blocked polyoxyalkylene compound (b) and the sulfur-containing anionic surfactant (c).

12. The sizing composition of claim 1, wherein said $R_4$ is a residue of nonylphenol-EO(10).

13. The composition of claim 10, wherein said phenol is a reaction product of one mole of the compound having the formula (5) with 1 to 10 moles of at least one compound selected from the group consisting of styrene and a substituted styrene.

14. The composition of claim 1, wherein said X is at least one member selected from the group consisting of $-CH_3$, $-CO-CH_3$ and $-CONH-CH_3$.

15. The composition of claim 2, wherein the emulsifier component comprises:
   (1) 10–80% by weight of said sulfur-containing anionic surfactant (c); and
   (2) 20–90% by weight of said blocked polyoxyalkylene compounds (b).

16. The composition of claim 15, wherein the emulsifier component further comprises 20 to 90% by weight of unblocked polyoxyalkylene type nonionic surfactants or polyhydric alcohol fatty ester type nonionic surfactants.

* * * * *